June 16, 1953
L. E. SPEARS ET AL
2,641,891
COTTON HARVESTING MACHINE
Filed Jan. 11, 1949
5 Sheets-Sheet 1
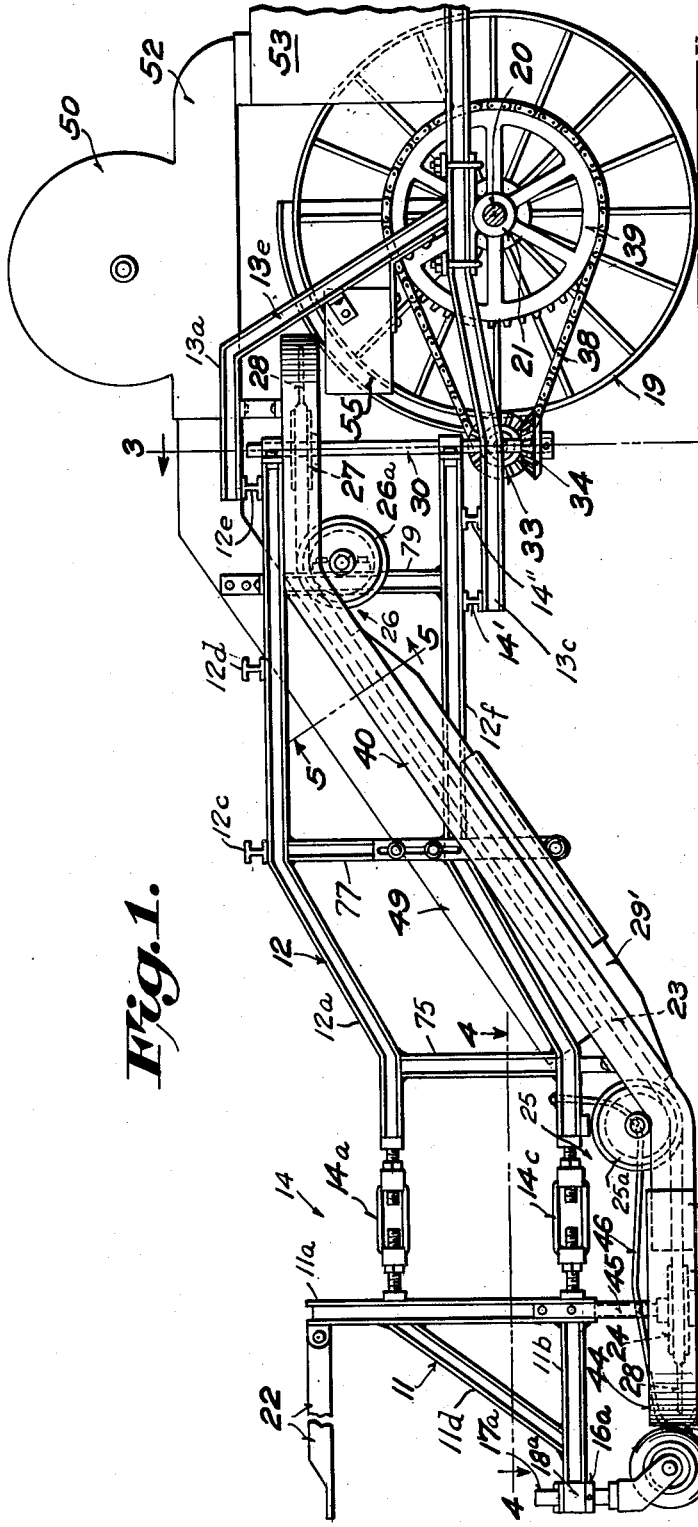
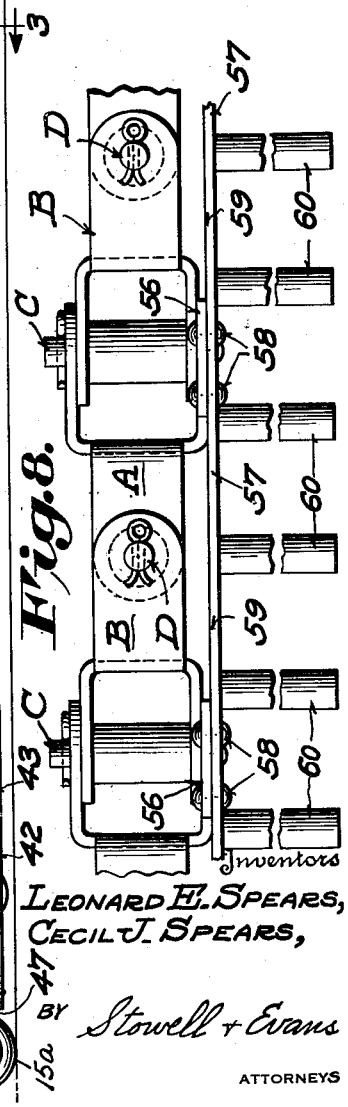
Inventors
LEONARD E. SPEARS,
CECIL J. SPEARS,
BY Stowell + Evans
ATTORNEYS June 16, 1953     L. E. SPEARS ET AL     2,641,891
COTTON HARVESTING MACHINE
Filed Jan. 11, 1949     5 Sheets-Sheet 2
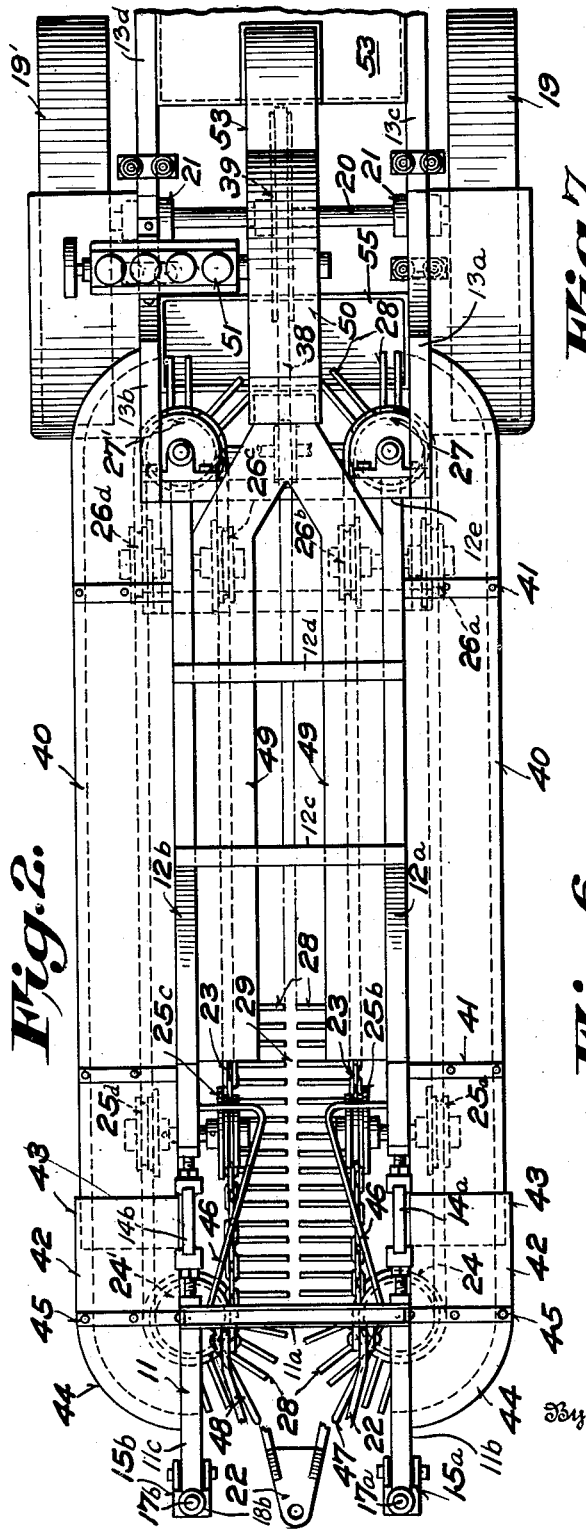
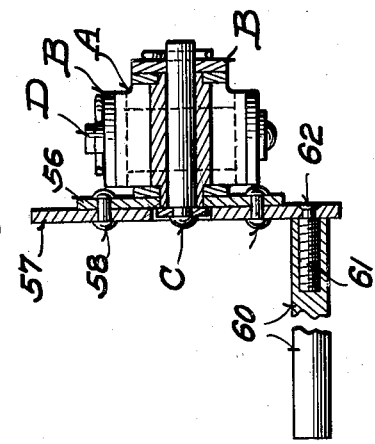
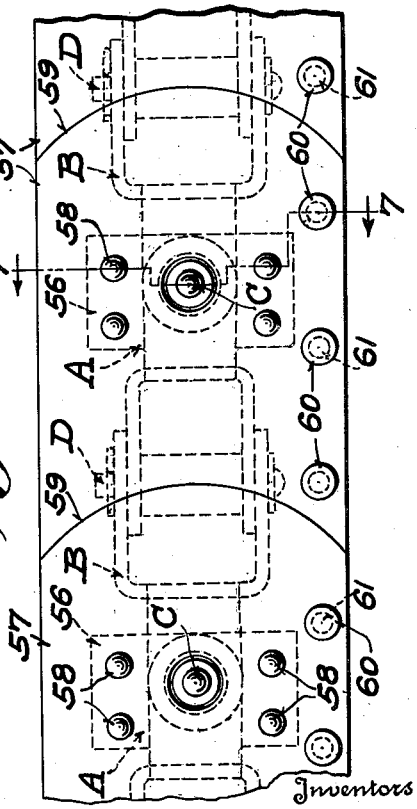
Inventors
LEONARD E. SPEARS,
CECIL J. SPEARS,
Stowell & Evans
ATTORNEYS

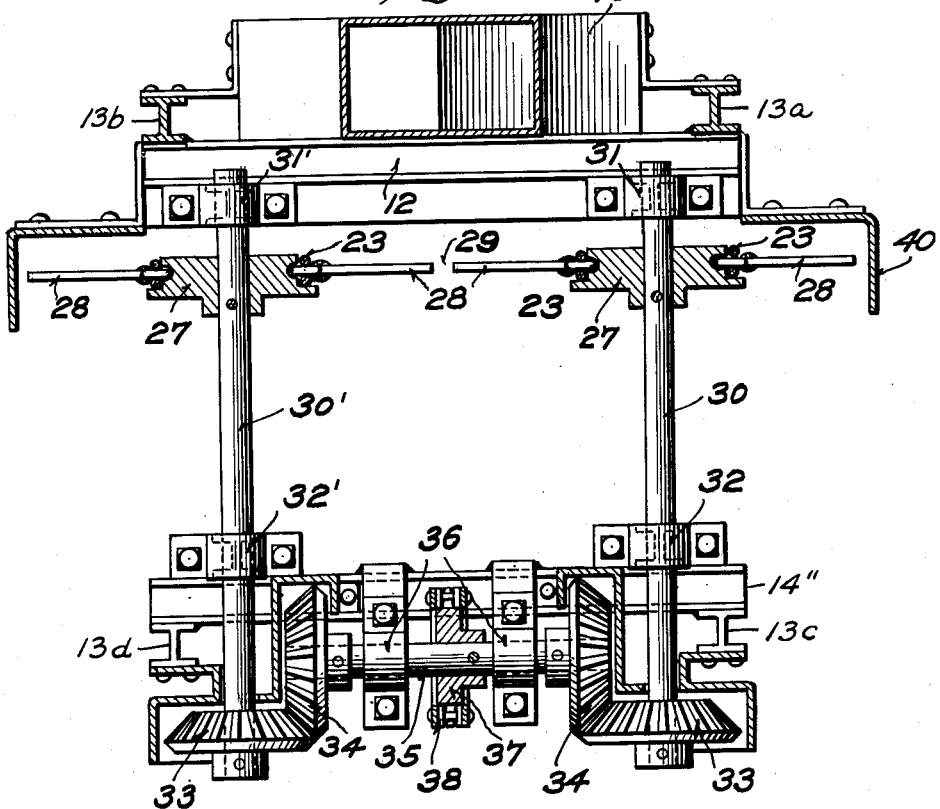
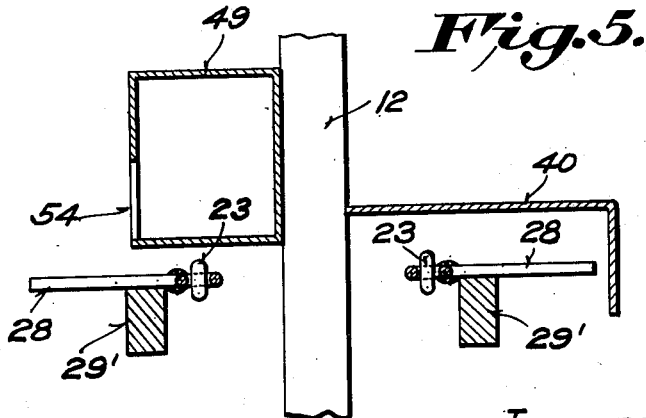

June 16, 1953  L. E. SPEARS ET AL  2,641,891
COTTON HARVESTING MACHINE
Filed Jan. 11, 1949   5 Sheets-Sheet 5

INVENTORS
LEONARD E. SPEARS,
BY CECIL J. SPEARS,
Stowell & Evans
ATTORNEYS

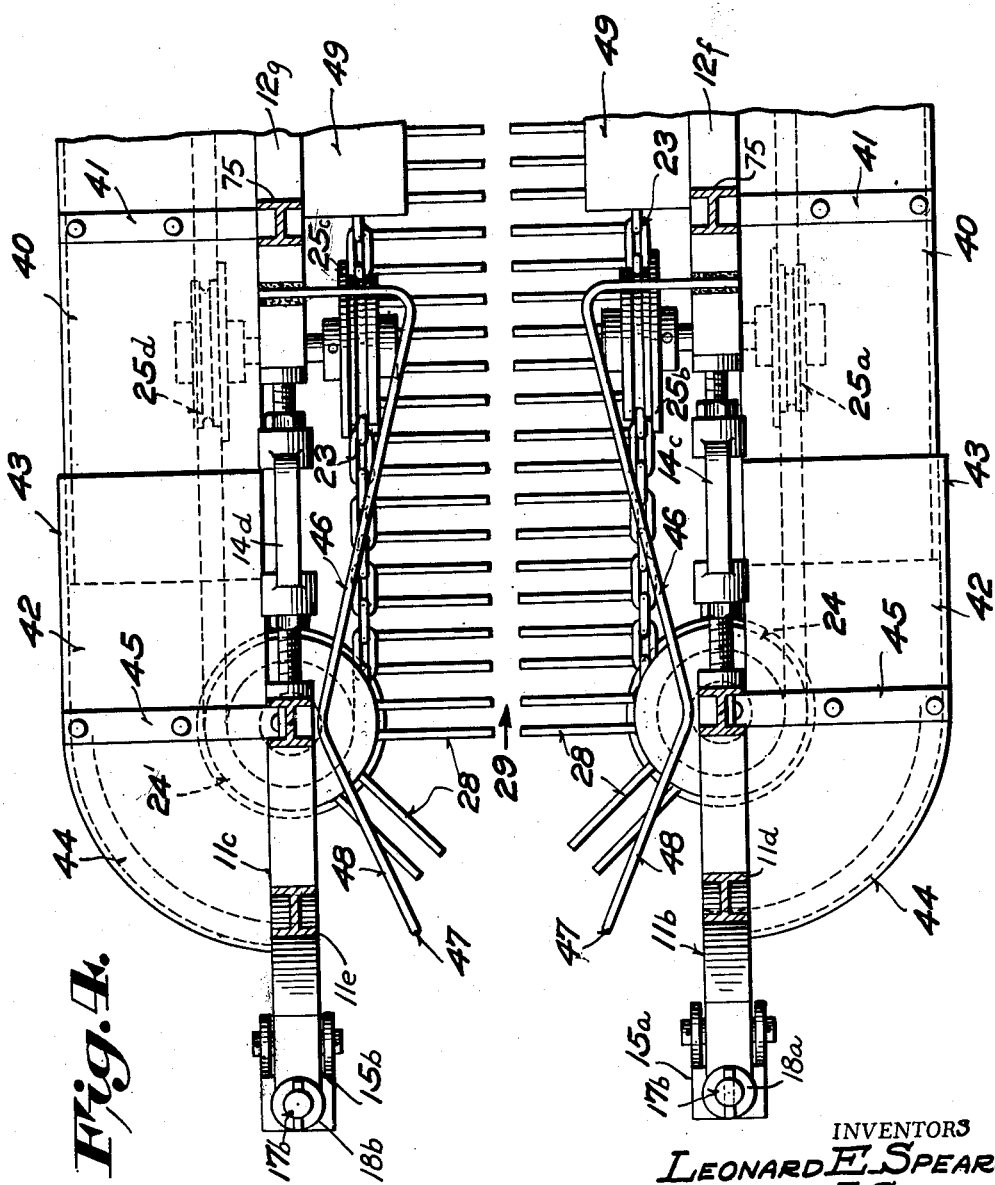

Patented June 16, 1953

2,641,891

UNITED STATES PATENT OFFICE 2,641,891

COTTON HARVESTING MACHINE

Leonard E. Spears and Cecil J. Spears,
Enfield, N. C.

Application January 11, 1949, Serial No. 70,236

5 Claims. (Cl. 56—35)

This invention relates to harvesting machines and more particularly to a cotton harvester for stripping mature or ripened bolls from cotton plants. Although the machine is especially adapted to the harvesting of cotton, it can also be used for harvesting other crops such as beans or peanuts.

An object of the invention is to provide a machine of this character that strips cotton plants cleanly of their bolls without taking an undue quantity of plant refuse, such as twigs and leaves, and without substantially bending over, breaking or otherwise mutilating the plants.

Another object is to provide a harvesting machine that substantially eliminates hand picking.

Another object is to provide a cotton harvester that operates rapidly and efficiently and reduces substantially the cost of picking cotton.

Another object is to provide a machine of this type that embodies a plurality of improved features cooperating and contributing to the functioning of a complete unit, whereby the foregoing and other objects of the invention are achieved.

The harvesting machine of the invention typically includes a land vehicle, a pair of endless chains carried by the vehicle, means supporting the chains for continuous travel between a forward lower position adjacent the ground and a rearward elevated position, a flight of one chain being laterally spaced from and parallel to a flight of the other chain, the flights extending rearwardly from the forward position for a substantial distance along substantially horizontal lines and thereafter inclining upwardly and rearwardly, a plurality of stripper fingers longitudinally spaced on the chains and extending towards each other from the flights, and means for driving the chains to move the chain flights rearwardly as the vehicle advances.

Preferably, the chains are driven in synchronism with the forward movement of the vehicle to move the chain flights rearwardly at substantially the same rate as the rate of forward movement of the vehicle.

Means, to be described in detail hereinafter, may be provided for regulating tension in the stripper chains. Other features of the invention will appear in the detailed description to follow.

The invention will be described in greater detail, and other of its aims, objects and advantages will be in part apparent and in part pointed out, with reference to the drawings, wherein:

Fig. 1 is a side elevational view of one form of cotton harvester in accordance with the invention;

Fig. 2 is a plan view thereof;

Fig. 3 is an enlarged transverse sectional view taken along the plane of the line 3—3 of Fig. 1 showing a portion of the chain driving mechanism;

Fig. 4 is an enlarged horizontal sectional view of the front portion of the machine taken along the plane of the line 4—4 of Fig. 1;

Fig. 5 is an enlarged detail sectional view of a portion of the machine taken along the line 5—5 of Fig. 1;

Fig. 6 is a greatly enlarged side view of a length of chain that may be employed in the harvester;

Fig. 7 is a sectional view thereof taken along the plane of the line 7—7 of Fig. 6;

Fig. 8 is a plan view of the length of chain shown in Fig. 7;

Figure 9:
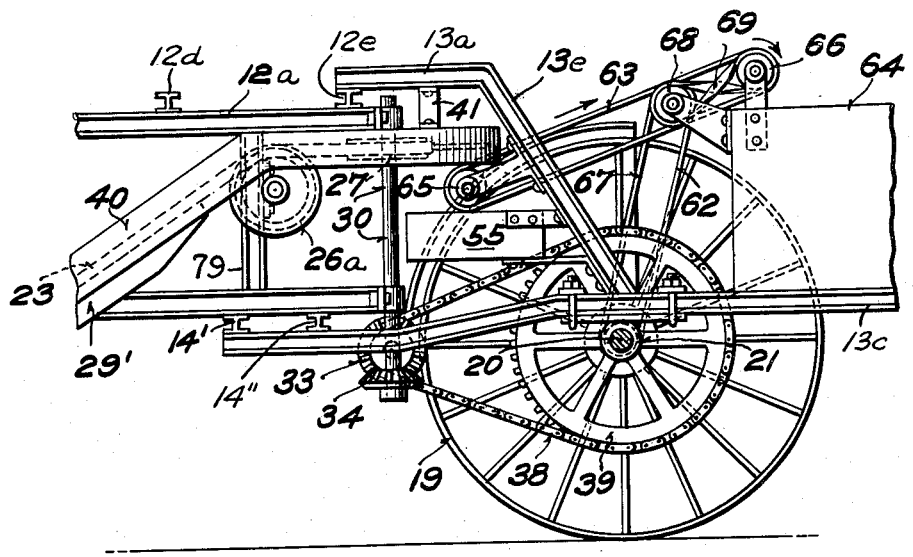
Fig. 9 is a vertical longitudinal sectional view of a rear portion of a modified form of harvester.

With reference to the drawings, and in particular to Figs. 1 and 2 thereof, the cotton harvester of the invention generally comprises a front section 11, a center section 12, and a rear section 13.

The forward or front section 11 of the machine includes a yoke bar 11a of substantially U-shape positioned with the legs of the yoke bar projecting vertically downwardly. At the lower end of each leg of the yoke bar is provided a horizontal frame member 11b and 11c, respectively, which extend generally forwardly of the yoke bar 11a. Frame members 11b and 11c are further connected to the yoke member 11a by rigid braces 11d and 11e, respectively. At the forward end of frame members 11b and 11c are provided adjustable ground engaging caster wheels 15a and 15b. The elevation of the forward end of the machine is adjusted with respect to the ground by varying the position of the set collars 16a and 16b on the king pins 17a and 17b journalled in the bearings 18a and 18b of frame members 11b and 11c.

The center section 12 of the machine includes identical upper frame members 12a and 12b having horizontally extending ribs 12c and 12d and 12e. Positioned beneath the frame members 12a and 12b are complementary identical lower frame members 12f and 12g. The vertical alignment of the upper and lower frame members is maintained by paired vertical supports or ribs 75, 77, and 79.

The lower frame members are cross-connected by only two ribs 14' and 14" positioned at the rearward end of the center section. Thus there are no cross ribs or members on the lower frame members from the front section 11 to the rearward end of center section 12, to interfere with the stalks of the upstanding cotton plants.

The front section 11 is adjustably attached to the center section by turnbuckles 14a, 14b, 14c, and 14d, or similar extensible joint means. As is seen in Figs. 1, 2, and 4, one end of turnbuckles 14a, 14b, 14c, and 14d is secured to the rearward side of yoke bar 11a and connects respectively to frame members 12a, 12b, 12f, and 12g. As more fully described hereinafter, the forward ends of the endless chains are supported in the front frame section 11 so that they may be tensioned by merely adjusting the turnbuckles 14a, 14b, 14c, and 14d, which turnbuckles will be hereinafter generally referred to as turnbuckles 14.

The rear section 13 of the machine which carries the main drive wheels, chain drive mechanism and secondary conveyor means to be more fully explained hereinafter, comprises upper parallel frame members 13a and 13b which connect to the upper center section frame members through horizontal rib 12e, and lower parallel frame members 13c and 13d which connect to the lower center section frame members 12f and 12g through horizontal ribs 14' and 14''. The rearward ends of the upper parallel frame members 13a and 13b are connected to the lower parallel frame members 13c and 13d by rigid braces 13e and 13f, respectively.

The rear portion of the machine is supported by wheels 19 and 19' carried by an axle 20 journalled in bearings 21 bolted or otherwise fixed to the frame. Since certain parts of the machine are driven from the axle 20, as will be described in detail hereinafter, and since the vehicle must be capable of making turning movements, one of the rear wheels may be keyed to the axle and the other wheel may be floatingly mounted on the axle; or conventional over-riding clutch hubs may be used for mounting the rear wheels on the axle 20.

A draw bar 22 is attached to the front frame section 11 so that the harvester may be towed in operation over a row of cotton plants to be stripped.

The front and center sections 11 and 12 provide a support for the cotton stripping mechanism of the machine. This mechanism includes a pair of endless chains, belts or the like 23 and 23'. Each chain is mounted at its forward end on horizontal idler wheels 24 and 24' respectively journalled in the front frame section. The flights of the chain extend substantially horizontally rearwardly to the vertical idler wheels 25a, 25b, 25c, and 25d, hereinafter generally referred to as idler wheels 25, under which they pass. From the wheels 25, the chain flights extend rearwardly, upwardly and over the idler wheels 26a, 26b, 26c, and 26d, which hereinafter will be generally referred to as idler wheels 26, that are mounted on the center frame section 12 for vertical rotation. The rear loop of each chain is engaged on a driven wheel 27 and wheel 27', respectively mounted for horizontal rotation, and the flights of the chain extend substantially horizontally between the wheels 26a, 26b and 27 and 26c, 26d and 27' respectively.

From an inspection of Fig. 1, it will be seen that the chains extend from a lower forward position adjacent the ground horizontally rearwardly for a substantial distance. They then incline upwardly and rearwardly at an angle of about 35° to a level above the tops of mature cotton plants. The chains then extend rearwardly and horizontally for a substantial distance.

The chains are driven, by means to be described hereinafter, so that the centrally opposed flights thereof travel rearwardly as the vehicle moves in the forward direction, the rate of travel of the opposed chain flights being substantially equal to, but opposite in sense to, the rate of travel of the vehicle.

Chains 23 and 23' are provided with a plurality of evenly spaced horizontally projecting stripper fingers 28. These fingers extend from the opposed central flights of the chains toward the center line of the space between the flights and terminate to provide a narrow gap 29 between the finger tips. The width of the gap 29 preferably is slightly greater than the base diameter of the main stalks of mature cotton plants. The fingers traveling in the inclined portions of the chain flights are supported in part by rails 29' carried by the frame and underlying the fingers.

With reference to Fig. 3, the chain drive mechanism will be described with reference to chain 23. Chain 23' is provided with a similar drive mechanism, the parts of which are designated in the drawings with primed reference numerals. The driven wheel 27 is keyed to a vertical shaft 30 rotatably received in an upper bearing 31 and a lower bearing 32 mounted on the rear of the center frame section 12. Keyed to the bottom of shaft 30, is a bevel gear 33. The gear 33 meshes with bevel gear 34 fixed to a cross-shaft 35 carried in bearings 36 mounted on the frame. At the center of the cross-shaft is a sprocket wheel 37 also keyed to the shaft 35, which sprocket is driven by a sprocket chain 38 from the large sprocket wheel 39 shown in Fig. 1. The latter is keyed to the rear axle 20 for rotation therewith as the vehicle is towed. It will be seen that the chain driving mechanism moves the central flights of the stripper chains 23 and 23' in a rearward direction as the vehicle is towed forwardly. The gear ratios are preferably chosen so that the central flights of the chains 23 and 23' remain substantially stationary, as regards horizontal movement with respect to the ground, when the vehicle moves in the forward direction. However, the stripper fingers carried by the inclined portions of the central chain flights move substantially vertically upward with respect to the ground as the vehicle advances.

Referring to Fig. 4, showing the front end of the harvester in horizontal section, the return flights of the chains 23 and 23' that are located outside the lateral boundaries of the frame are protected by sheaths or covers each having a rear portion 40 supported on the center frame section 12 by mounting brackets 41. The sheath has a front portion 42 telescoped over the rear sheath portion at 43, the front portion being rounded at 44 to cover the outer half of the front loop of the chain and stripper fingers. Brackets 45 serve to mount the front sheath portion on the front frame section 11. The telescoping sheath construction permits the front frame section to be adjusted by the turnbuckles 14 for regulating tension on the chains 23 and 23'.

As shown in Fig. 4 in plan and in Fig. 1 in elevation, guides 46 are welded to the frame. These guides are formed of rod stock and have rounded noses 47 projecting beyond the front of the stripper fingers that engage beneath the lowest branches of a cotton plant, as the machine advances thereover, and raise the lower branches. The lower branches of the plant are guided by the rearwardly extending guide portions 48 and laid gently on the stripper fingers. It will be seen that the horizontal front portion of the stripper mechanism extends for a substantial distance longitudinally of the harvester; preferably this distance is somewhat greater than the maximum diameter of the average mature cotton plant whereby the lower branches of the plant are fully engaged by the stripper fingers before the inclined portion of the stripper mechanism reaches the plant.

Disposed parallel and adjacent to the inclined portions of the stripper chains 23 and 23', as seen in Figs. 1 and 2, are a pair of suction conduits 49 that are connected at their upper ends to a suction fan 50 driven by an engine or motor 51. The fan exhausts through a conduit 52 into a receiving bin 53 carried on the rear frame section 13 of the vehicle. As shown in Fig. 5, the suction conduits 49 are provided with a plurality of longitudinally disposed intake ports 54 opening towards the fingers 28 of the inner flights of the stripper device. Cotton bolls that are removed from the plants are drawn into the suction conduits 49 through the ports 54 and are conveyed to the bin 53 by way of the fan 50 and exhaust conduit 52. An open top box 55 is mounted below the rear loops of the stripper mechanism to receive unopened bolls and the few twigs that are stripped by the fingers 28 and are not removed therefrom by the suction device.

In operation, the harvester is hitched to a towing vehicle for movement along and over a row of ripe cotton plants. It will be understood that the width of the vehicle between wheels is such that the harvester straddles a single row of cotton without damaging adjacent rows. The suction fan motor 51 is started to provide suction for removing the bolls from the stripper. The lower branches of the plants are successively laid upon the forward horizontal section of the stripper by the guides 46. As the inclined section of the stripper reaches a plant, the fingers 28 engaging the lower branches of the plant are raised substantially vertically through the plant to strip the bolls therefrom. Stripped bolls are removed from the fingers by the suction device and conveyed to the receiving bin 53. Any stripped material not removed from the fingers by the suction device is deposited in the box 55. The plants, after stripping, remain erect, thus facilitating follow-up hand picking to collect the few bolls of cotton that are not harvested by the machine and clearing of the field.

It has been found that, although the simple link chains 23 and 23' shown in the machine of Figs. 1 to 5 satisfactorily serve their intended purpose, chains of the so-called universal type, as illustrated in Figs. 6 to 8, may be employed to advantage. Such chains have alternate links A and B joined together by pins C and D and have the characteristics that, although they may be flexed universally, they cannot be twisted. Links A are provided with brackets 56 to which finger mounting plates 57 are secured by rivets 58. The plates 57 have abutting ends 59 arcuately curved about the centers of pins C to permit flexing in the vertical direction about pins C, as shown in Fig. 6. Horizontal flexing about pins D is limited, as seen in Fig. 8, to movement away from the finger mounting plates 57.

A plurality of horizontally projecting stripper fingers 60 are mounted along the lower edges of the plates 57. These are typically secured to the plates by being screwed to studs 61 that are riveted, as at 62, to the plates 57.

The universal chain is accommodated by both vertical and horizontal sprocket wheels and may be utilized in an obvious manner in the harvester hereinbefore described. For such utilization, it is only necessary to substitute suitable sprockets for the wheels 24, 24', 25, 26, 27, and 27' of the harvester of Figs. 1 through 5.

Use of universal chains has the advantage that the stripper fingers are supported more rigidly thereby than by simple link chains and the support rails 29' may be eliminated.

Figure 10:
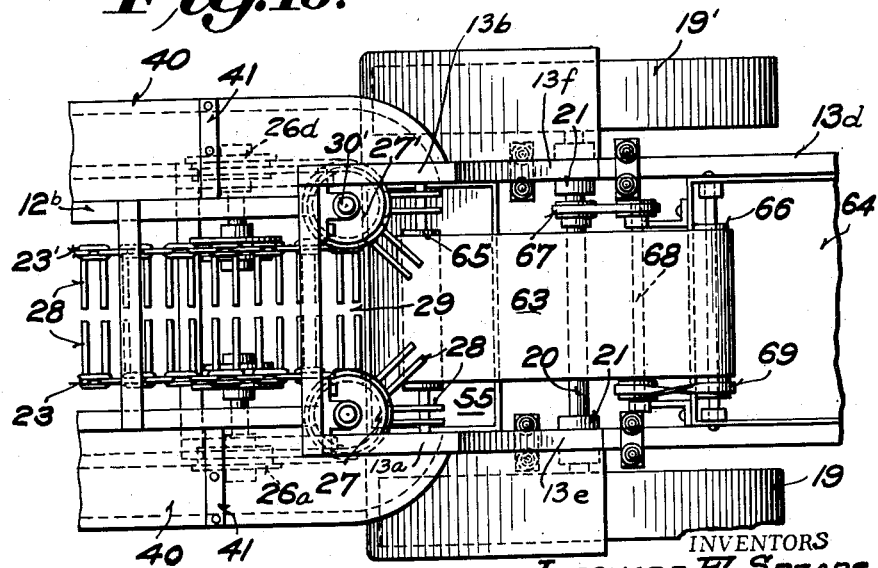
Fig. 10 is a plan view of the harvester of Fig. 9.

Referring to Figs. 9 and 10, the modified form of cotton harvester shown dispenses with the suction device for removing stripped bolls from the stripper fingers and substitutes therefor a mechanical conveyor for transporting the harvested bolls to a receiver. This conveyor has an endless belt 63, the top flight of which travels continuously from a receiving point beneath the rear loops of the strippers to a discharge point over a receiver 64. The belt 63 is carried on rollers 65 and 66 suitably journalled on the machine and is driven from the axle 20 through a chain-and-sprocket drive 67, cross-shaft 68, and belt-and-pulley drive 69.

In operation of the modified form of harvester, the stripped cotton bolls fall from the stripper fingers 28 at the rear loops of the stripper device upon the top flight of the belt 63 and are carried by the belt to the bin 64 into which they are discharged.

From the foregoing description it will be seen that the invention provides a cotton harvester or the like that has a horizontal section at the forward end of the stripper mechanism, which section receives and steadies the cotton plants before the stripper fingers are raised through the plant to comb out the cotton bolls. Such construction effectively minimizes damage to the plants during the stripping thereof and enables the harvester to effect very high recoveries of cotton. The adjustable front frame section provides means for properly tensioning the stripper chains without disturbing the arrangement of front guides and chain guards.

It will be apparent that various modifications may be made in the exemplary forms of harvester herein shown and described without departing from the invention. It is contemplated, for instance, that the shape of the stripper fingers may be varied to handle crops other than cotton and that the vehicle may be of the automotive type. Many other variations will occur in the light of the foregoing description.

As used herein, the term "chain" denotes in a broad sense belts, cables and the like capable of carrying stripper fingers.

We claim:

1. A cotton harvester and the like comprising a land vehicle, a pair of endless chains carried by said vehicle, said pair of chains having elongated flights in a common plane and having a forward lower portion adjacent the ground and a rearward elevated portion, the opposed flight of one chain being laterally spaced from and substantially parallel to a bight of the other chain, said flights extending rearwardly from said forward portion for a distance in a substantially horizontal plane and from said forward portion upwardly and rearwardly, a plurality of elongated stripper fingers longitudinally spaced on said chains and extending outwardly therefrom, the fingers along said flights extending towards each other and terminating short of each other to provide a substantial gap between the tips of opposed fingers to permit the stalks of cotton plants to be received in said gap, means operatively connected to said chains for driving said chains to move said chain flights rearwardly as the vehicle advances, and support means underlying said fingers along a major portion of said flights.

2. A cotton harvester and the like comprising a land vehicle, a pair of endless chains carried by said vehicle, said pair of chains having elongated flights in a common plane and having a forward lower portion adjacent the ground and a rearward elevated portion, the opposed flight of one chain being laterally spaced from and substantially parallel to a flight of the other chain, said flights extending rearwardly from said forward portion for a distance in a substantially horizontal plane and from said forward portion upwardly and rearwardly, a plurality of elongated stripper fingers longitudinally spaced on said chains and extending outwardly therefrom, the fingers along said flights extending toward each other and terminating short of each other to provide a substantial gap between the tips of opposed fingers to permit the stalks of cotton plants to be received in said gap, means operatively connected to said chains for driving said chains in synchronism with the forward movement of said vehicle to move said chain flights rearwardly at substantially the same rate as the rate of forward movement of the vehicle, and support means underlying said fingers along a major portion of said flights.

3. A cotton harvester and the like comprising a land vehicle, a pair of endless chains carried by said vehicle, said pair of chains having elongated flights in a common plane and having a forward lower portion adjacent the ground and a rearward elevated portion, the opposed flight of one chain being laterally spaced from and substantially parallel to a flight of the other chain, said flights extending rearwardly from said forward portion for a distance in a substantially horizontal plane and from said forward portion upwardly and rearwardly, said endless chains comprising a plurality of links connected for pivotal motion about transverse axes, the axis of each pivotal connection being disposed at an angle of 90° to the axis of adjacent pivotal connections, a plurality of stripper fingers longitudinally carried by alternate links of the endless chains and extending outwardly therefrom, the fingers along said flights extending towards each other and terminating short of each other to provide a substantial gap between the tips of opposed fingers to permit the stalks of cotton plants to be received in said gap, means operatively connected to said chains for driving said chains to move said chain flights rearwardly as the vehicle advances, and support means underlying said fingers along a major portion of said flights.

4. A cotton harvester and the like as defined in claim 1 wherein said vehicle comprises a front frame section including means supporting said chains at the forward lower positions and a rear frame section having means supporting said chains at their rearward elevated positions, and adjustable coupling means uniting said frame sections, whereby the front-to-rear spacing of said frame sections is varied and tension in said chains is regulated.

5. A cotton harvester and the like as defined in claim 1 wherein said vehicle comprises a front frame section including wheels supporting said chains at their forward lower positions and a rear frame section having wheels supporting said flights at the rearward ends of the forward horizontal portions and wheels supporting said chains at their rearward elevated positions, and adjustable coupling means uniting said frame sections, whereby the front-to-rear spacing of said frame sections is varied and tension in said chains is regulated.

LEONARD E. SPEARS.
CECIL J. SPEARS.

References Cited in the file of this patent

UNITED STATES PATENTS

| Number | Name | Date |
| --- | --- | --- |
| Re. 1,961 | Penn | May 16, 1865 |
| 1,153,968 | Speck | Sept. 21, 1915 |
| 1,177,104 | Hendricks | Mar. 28, 1916 |
| 1,215,660 | Johnson | Feb. 13, 1917 |
| 1,242,761 | Blohm | Oct. 9, 1917 |
| 1,264,385 | Grojean | Apr. 30, 1918 |
| 1,886,151 | Benjamin | Nov. 1, 1932 |
| 1,942,192 | Stone | Jan. 2, 1934 |
| 2,302,656 | Dray | Nov. 17, 1942 |